United States Patent [19]

Uchida

[11] Patent Number: 5,157,934
[45] Date of Patent: Oct. 27, 1992

[54] CONTROLLER FOR ELECTRICALLY DRIVEN EXPANSION VALVE OF REFRIGERATING CYCLE

[75] Inventor: Tadashi Uchida, Fuji, Japan

[73] Assignee: Kabushiki Kaisha Toshiba, Kawasaki, Japan

[21] Appl. No.: 722,197

[22] Filed: Jun. 27, 1991

[30] Foreign Application Priority Data

Jun. 29, 1990 [JP] Japan .................... 2-171484

[51] Int. Cl.⁵ .......................................... F25B 41/00
[52] U.S. Cl. ......................................... 62/212; 62/225
[58] Field of Search .................................. 62/210, 225

[56] References Cited

U.S. PATENT DOCUMENTS

| 4,375,753 | 3/1983 | Imasu et al. | 62/225 X |
| 4,527,399 | 7/1985 | Lord | 62/225 X |
| 4,617,804 | 10/1986 | Fukushima et al. | 62/212 |
| 4,848,099 | 7/1989 | Beckey et al. | 62/212 |

FOREIGN PATENT DOCUMENTS 62-51384 10/1987 Japan.
63-45030 9/1988 Japan.

Primary Examiner—John Rivell
Attorney, Agent, or Firm—Foley & Lardner

[57] ABSTRACT

A valve controller which controls the opening degree of an electrically driven expansion valve mounted in the refrigerating cycle, in accordance with a difference between a refrigerant saturation temperature of an outdoor heat exchanger detected with a first temperature sensor and a refrigerant temperature at the suction port of a compressor detected with a second temperature sensor. A sensor error correcting unit is provided whereby a detected temperature error is calculated in accordance with the outputs of the first and second temperature sensors exposed in an atmospheric air having a specific temperature, and in accordance with the detected temperature error, a difference between the refrigerant saturation temperature and the refrigerant temperature at the suction port of the compressor is corrected.

6 Claims, 4 Drawing Sheets

5,157,934

CONTROLLER FOR ELECTRICALLY DRIVEN EXPANSION VALVE OF REFRIGERATING CYCLE

FIELD OF THE INVENTION

The present invention relates to a controller for controlling the opening of an electrically driven expansion valve mounted in a refrigerating cycle system, in accordance with a difference between a refrigerant saturation temperature of an outdoor heat exchanger and a refrigerant temperature at the suction port of a compressor.

DESCRIPTION OF RELATED ART

A frequency converter and an a.c. motor are used for the capacity variable operation of a compressor which constitutes a refrigerating cycle in an air conditioner. The frequency converter is constructed of a rectifier for rectifying an a.c. input and smoothing it into a d.c. output, and an inverter for transforming a d.c. input into an a.c. output of variable-voltage/variable-frequency.

An air conditioner using such a frequency converter is provided with a frequency controller which supplies an output frequency command to the inverter, the output frequency command being representative of the a.c. frequency corresponding to the speed of the compressor and being determined in accordance with a difference between a preset room temperature and a detected room temperature.

For an air conditioner of this type, there has been proposed a method whereby an electrically driven expansion valve is mounted in the refrigerating cycle and the super heat degree (a difference between a refrigerant saturation temperature of an outdoor heat exchanger and a refrigerant temperature at the suction port of a compressor) is controlled to be constant.

More particularly, a refrigerant saturation temperature of the outdoor heat exchanger and a refrigerant temperature at the suction port of the compressor are detected and a difference therebetween is calculated. A super heat temperature is set in accordance with an actual running speed of the compressor. The opening degree of the electrically driven expansion valve is regulated so as to make the preset super heat temperature equal to a detected super heat temperature. For such regulation, there is provided a valve controller.

The speed of the compressor is controlled by means of the frequency controller and the frequency converter, and the electrically driven expansion valve is controlled by means of the valve controller, resulting in a more reliable operation of the refrigerating cycle.

In order to control the super heat degree to be constant, it becomes necessary to prepare a temperature sensor for detecting a refrigerant saturation temperature of an outdoor heat exchanger and another temperature sensor for detecting a refrigerant temperature at the suction port of the compressor. Even if a slight instrument error is present between the two sensors, it can be corrected by some electrical means. Air conditioners at the delivery stage from factories are therefore free from influences of instrument errors because of various electrical adjustments at this stage.

However, for conventional air conditioners of this type, no means for dealing with secular changes of temperature sensors has not been provided. If the refrigerating cycle operation is repeated for a long period of time, a mismatch state appears in the refrigerating cycle because of secular changes of temperature sensors, losing the original performance at the delivery stage.

SUMMARY OF THE INVENTION

The present invention has been made to solve the above-described problem. It is an object of the present invention to provide a controller for an electrically driven expansion valve, capable of stably maintaining a matching state of the refrigerating cycle for a long period of time regardless of a change of the characteristics of temperature sensors.

According to an aspect of the present invention, in a controller for regulating the opening degree of an electrically driven expansion valve mounted in the refrigerating cycle system, in accordance with a difference between a refrigerant saturation temperature of an outdoor heat exchanger detected with a first temperature sensor and a refrigerant temperature at the suction port of a compressor detected with a second temperature sensor, there is provided a sensor error correcting means for calculating a detected temperature error on the basis of the outputs from the first and second temperature sensors when both are exposed in an atmospheric air at a specific temperature, and in accordance with this detected temperature error, correcting a difference between the refrigerant saturation temperature and the refrigerant temperature at the suction port of a compressor.

If the characteristics of one or both of two temperature sensors change with time, it is very difficult to judge which temperature sensor is normal or if both of them are abnormal. In order to control the super heat degree to be constant, a difference is controlled between a refrigerant saturation temperature of an outdoor heat exchanger and a refrigerant temperature at the suction port of a compressor. If there appears any instrument error between two temperature sensors, it is possible to correct the temperature difference by an amount corresponding to the instrument error. The present invention has paid attention to this fact. On the basis of a detected temperature error between two temperature sensors obtained when they are exposed in an atmospheric air at a specific temperature, a difference is corrected between a refrigerant saturation temperature of an outdoor heat exchanger and a refrigerant temperature at the suction port of a compressor. As a result, even if the characteristics of temperature sensors change with time, a matching state in the refrigerating cycle can be stably maintained for a long period of time.

DETAILED DESCRIPTION OF THE PREFERRED EMBODIMENTS

Figure 1:
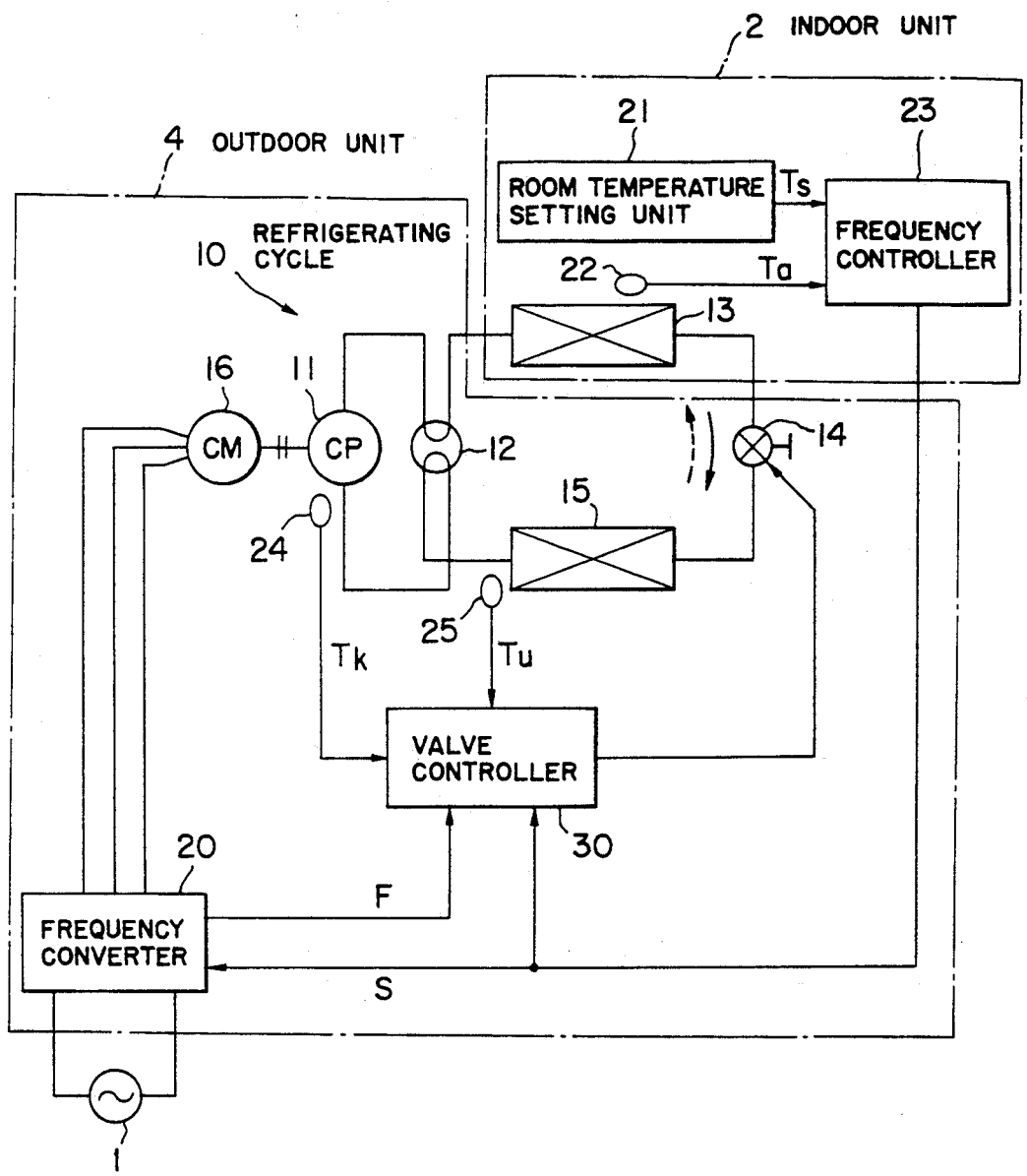
FIG. 1 is a schematic diagram briefly showing the structure of a controller for controlling an electrically driven expansion valve, according to an embodiment of the present invention.

FIG. 1 is a schematic diagram briefly showing the structure of an expansion valve controller according to an embodiment of the present invention. Referring to FIG. 1, a refrigerating cycle 10 is constructed of a compressor (CP) 11, a four-way valve 12, an indoor heat exchanger 13, an electrically driven expansion valve 14, and an outdoor heat exchanger 15. Refrigerant circulates in the direction indicated by a solid line in a heating mode, and in the direction indicated by a broken line in a refrigerating mode. The compressor 11 is subject to a capacity control operation by a compressor motor 16 which is variable-speed driven by an output from a frequency converter 20.

The frequency converter 20 is constructed of a rectifier and an inverter.

A room temperature value $T_s$ set by a room temperature setting device 21 and a detected room temperature $T_a$ detected with a temperature sensor 22 are inputted to a frequency controller 23. This frequency controller 23 calculates a compressor speed corresponding to the load of the air conditioner, and provides an output frequency command S to the frequency converter 20, the output frequency command S being representative of the calculated compressor speed. There are provided a temperature sensor 24 for detecting a refrigerant temperature at the suction port of the compressor 11 and another temperature sensor 25 for detecting a refrigerant saturation temperature of the outdoor heat exchanger 15. The detected temperature values together with the above-described output frequency command S are inputted to a valve controller 30. An actual operation frequency F of the frequency converter 20 is also inputted to the valve controller 30. The valve controller 30 controls the opening degree of the electrically driven expansion valve 14, in accordance with the inputted values.

An indoor unit 2 consists of the indoor heat exchanger 13, the room temperature setting device 21, the temperature sensor 22, and the frequency controller 23, and it is arranged in the room to be air-conditioned. An outdoor unit 4 consists of the other devices except the power source 1, namely, the compressor 11, the four-way valve 12, the electrically driven expansion valve 14, the outdoor heat exchanger 15, the compressor motor 16, the frequency converter 20, the temperature sensors 24, 25, and the valve controller 30, and it is arranged out of the room.

The operation of the embodiment constructed as above will be described below. Various well known techniques have been proposed and are for how the frequency controller 23 determines the converter output frequency on the basis of a room temperature value $T_s$ set by the room temperature setting device 21 and a room temperature $T_a$ detected with the temperature sensor 22, and how the converter 20 is controlled on the basis of a converter output frequency command S, so the description of such techniques is omitted. The operation of the valve controller 30 will be described with reference to FIGS. 2, 3A and 3B.

Figure 2:
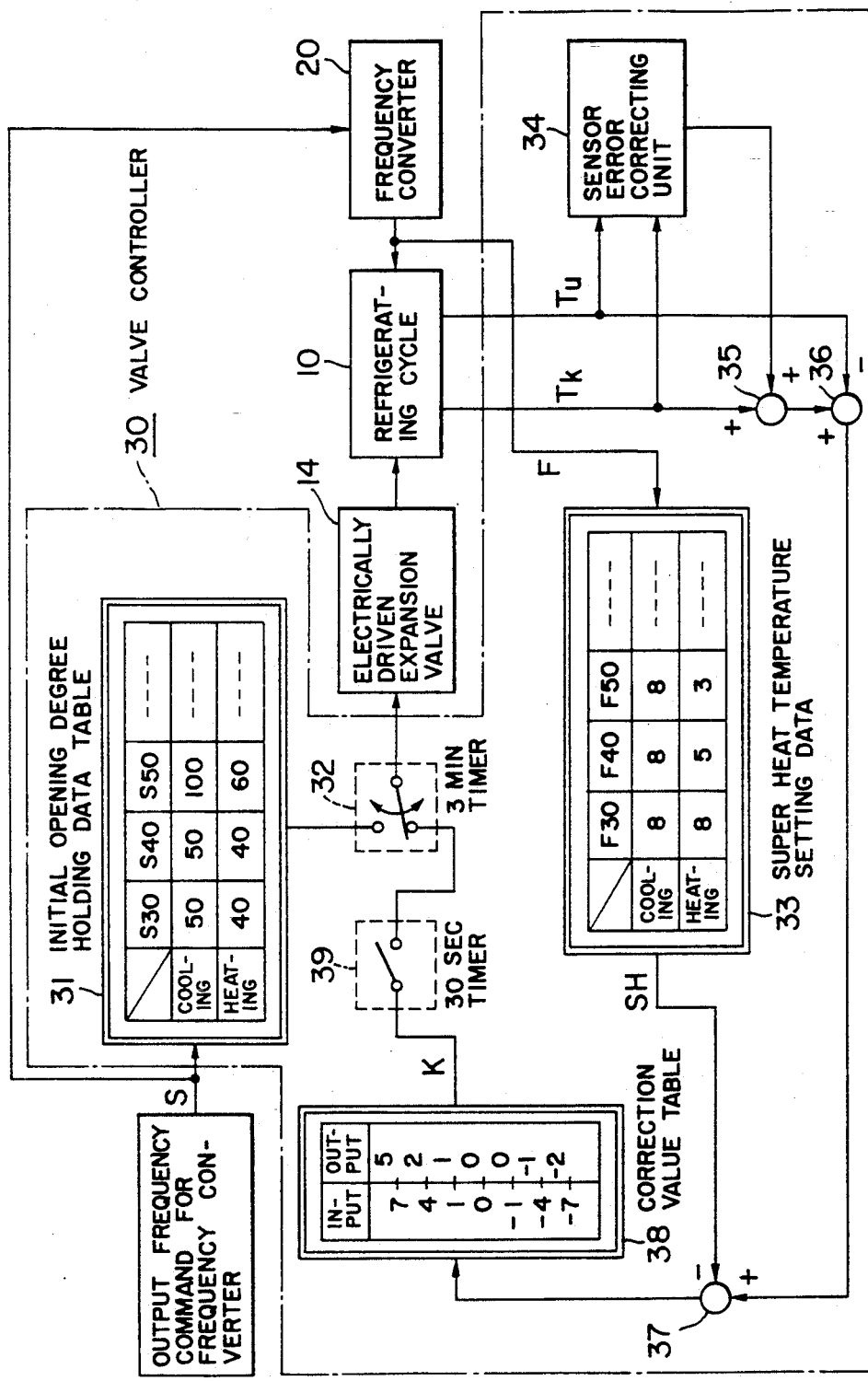
FIG. 2 is a functional block diagram showing the details of main elements of the controller shown in FIG. 1.

The valve controller 30 is constructed of a microcomputer, the function of which is shown in FIG. 2 in connection with the refrigerating cycle 10 and the converter 20.

Referring to FIG. 2, when the refrigerating cycle 10 is driven by the converter 20, a converter output frequency command S is inputted to the valve controller 30 which in turn calculates a valve opening degree command corresponding to the output frequency command S by using an initial opening degree holding data table 31. The calculated valve opening degree command is supplied to the electrically driven expansion valve 14 for three minutes counted by a three-minute counter 32 after the operation start of the air conditioner.

After the refrigerating cycle 10 starts operating, an actual operation frequency F of the converter 20 is supplied to the valve controller 30 which in turn calculates a super heat temperature corresponding to the actual operation frequency F by using a super heat temperature setting data table 33.

The refrigerant temperature $T_k$ at the suction port of the compressor 11 detected with the temperature sensor 24 and a refrigerant saturation temperature $T_u$ of the outdoor heat exchanger 15 detected with the temperature sensor 25 are always supplied to the valve controller 30. A sensor error correcting unit 34 checks if a refrigerant temperature $T_k$ at the suction port and a refrigerant saturation temperature $T_u$ respectively before the operation start of the air conditioner are equal to each other (if both the sensors 24 and 25 are correctly operating, both the temperatures are identical). If the temperatures are not equal, a calculation of $T_k - T_u$ is carried out, and a temperature correction value corresponding to the difference $T_k - T_u$ is obtained which is stored and outputted during the operation of the air conditioner. If the refrigerant temperature $T_k$ and the refrigerant saturation temperature $T_u$ are identical, the sensor error correcting unit 34 outputs a zero correction value. The temperature correction value is added to the refrigerant temperature $T_k$ by an adder 35, the output of which is supplied to a subtracter 36 to be subtracted by the refrigerant saturation temperature $T_u$.

If the temperature sensors 24 and 25 exposed in an atmospheric air having a specific temperature operate correctly, the temperatures $T_k$ and $T_u$ detected before the operation start of the air conditioner are coincident. During the operation, a value $T_k - T_u$ is outputted from the subtracter 36 as a super heat feedback value. On the contrary, if the temperature sensors 24 and 25 output different temperature values $T_k$ and $T_u$ before the operation start, the sensor error correcting unit 34 uses this difference to correct a value $T_k - T_u$, the corrected value being outputted from the subtracter 36 during the operation of the air conditioner.

Thereafter, a subtracter 37 obtains a difference between a temperature value set by using the super heat temperature setting data table 33 and a super heat feedback value outputted from the subtracter 36. In accordance with the obtained difference, a correction value table 38 obtains a correction value K which is used for correcting the opening degree of the electrically driven expansion valve 14. This correction value K is supplied to the electrically driven expansion valve 14 for 30 seconds counted by a thirty-second timer 39.

In summary, the sensor error correcting unit 34 corrects the super heat feedback value in accordance with a difference $T_k - T_u$ detected before the operation start of the air conditioner. For three minutes after the operation start, the initial opening degree of the electrically driven expansion valve 14 is set to a value determined only by the converter output frequency command S, and thereafter the opening degree is corrected every 30 seconds in accordance with the correction value K obtained by the correction value table 38.

As the opening degree of the expansion valve 14 is made large, the temperature difference $T_k - T_u$ (super heat degree) becomes small. On the other hand, as the opening degree is made small, the temperature difference $T_k - T_u$ becomes large.

Figure 3A:
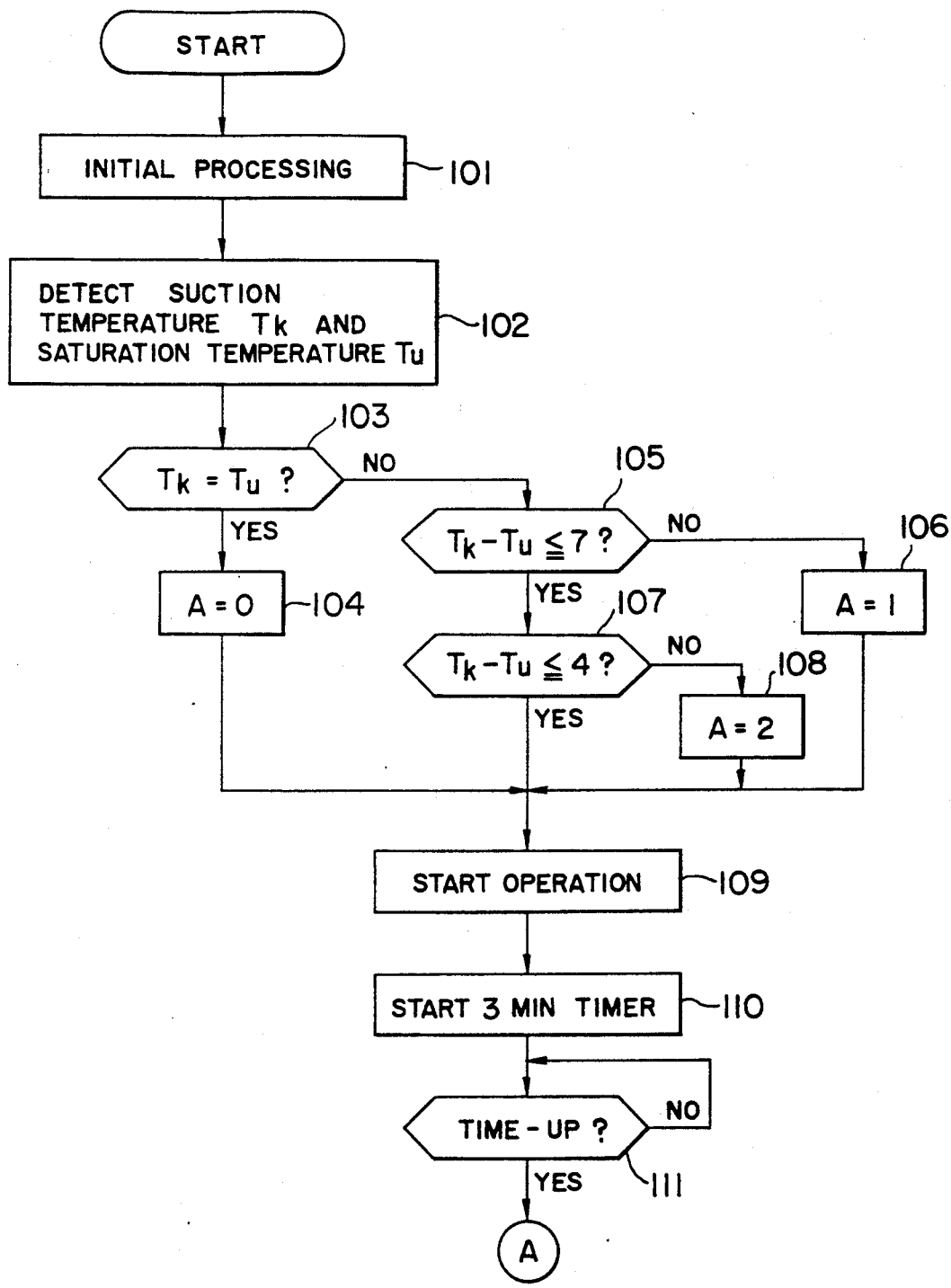
FIGS. 3A and 3B are flow charts illustrating the operation of the main elements of the controller shown in FIG. 1.
Figure 3B:
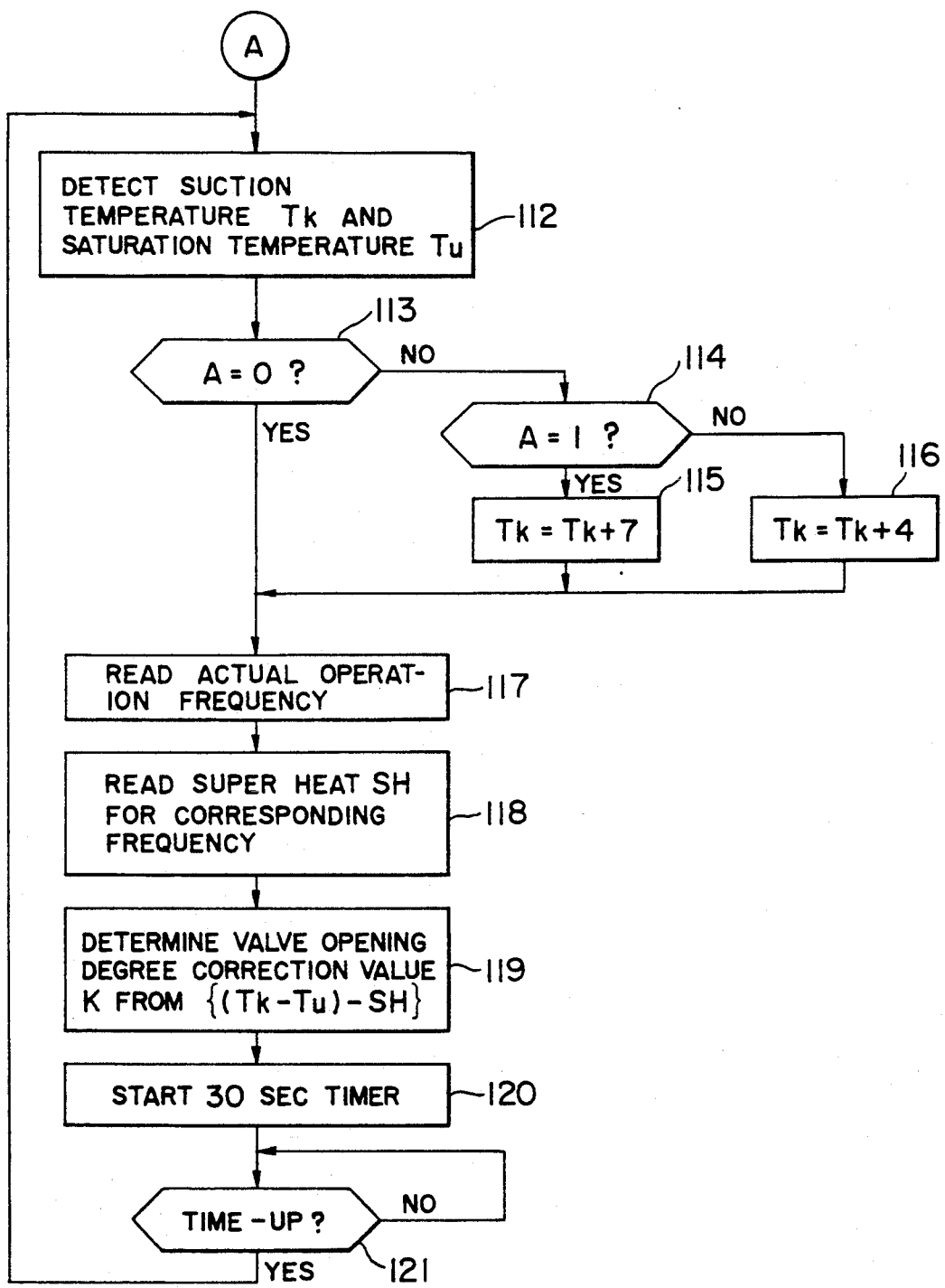

FIGS. 3A and 3B are flow charts illustrating the control procedure executed by the valve controller 30 made of a microcomputer.

At step 101, the valve controller 30 performs an initial processing. At step 102 there are detected a refrigerant temperature (suction temperature) $T_k$ at the suction port of the compressor 11 and a refrigerant saturation temperature $T_u$ of the outdoor heat exchanger 15. It is checked at step 103 if the detected temperatures $T_k$ and $T_u$ are coincident or not. If coincident, the correction value is set to zero and a correction flag A is set to A=0 at step 104. If not coincident, it is checked at step 105 if the difference is 7° C. or smaller. If not, the difference is in excess of 7° C. and the correction flag A is set to A=1. If 7° C. or smaller, it is checked at step 107 if the difference is 4° C. or smaller. If not, the correction flag A is set to A=2 at step 108.

The above operation is an initial processing before the operation of the air conditioner. After the initial processing, the refrigerating cycle 10 starts operating at step 109. At step 110, the three-minute timer starts operating. At step 111, the opening degree of the electrically driven expansion valve 14 is controlled in accordance with the opening degree command corresponding to the frequency command until the time-up of the timer is confirmed.

During the operation of the refrigerating cycle 10, there are detected at step 112 the temperature $T_k$ at the suction port of the compressor 11 and the saturation temperature $T_u$ of the outdoor heat exchanger 15. It is checked at step 113 if the correction flag is A=0. If A is not 0, it is checked at step 114 if the correction flag is A=1. If A=1, a process of $T_k+7$ is executed at step 115. If A is not 1, a process of $T_k+4$ is executed at step 116. The temperatures 4° C. and 7° C. have been determined through experiments.

Next, at step 117 the valve controller 30 reads the actual operation frequency F of the compressor 11. In accordance with the actual operation frequency F, a super heat data SH corresponding to the frequency F is read at step S118. Then, at step 119, the actual temperature difference $T_k-T_u$ is subtracted by the super heat data SH. In accordance with this difference, the valve opening degree correction value K is determined. Next, at step 120, the thirty-second timer starts operating. Upon confirmation of a time-up of the timer, the processes after step 112 are repeated.

The function described with FIG. 2 can be realized by the above operations. In this manner, the performance of an air conditioner at the delivery stage can be maintained even if the characteristics of temperature sensors change with time.

What is claimed is:

1. A controller for controlling an electrically driven expansion valve mounted in a refrigerating cycle including a capacity variable compressor, an outdoor heat exchanger, the expansion valve, and an indoor heat exchanger, comprising:

a first temperature sensor for detecting a refrigerant saturation temperature of said outdoor heat exchanger;

a second temperature sensor for detecting a refrigerant temperature at the suction port of said compressor;

sensor error correcting means for calculating a detected temperature error on the basis of the outputs from said first and second temperature sensors when both are exposed in an atmospheric air at a specific temperature, in accordance with said detected temperature error, correcting a difference between said refrigerant saturation temperature and said refrigerant temperature at the suction port of said compressor, and outputting said corrected temperature difference; and valve controlling means for controlling the opening degree of said electrically driven expansion valve in accordance with said corrected temperature difference.

2. A controller according to claim 1, wherein said valve controlling means includes an initial opening degree holding data table for storing a relationship between a rotation speed of said compressor and said valve opening degree command.

3. A controller according to claim 1, wherein said valve controlling means includes a first timer used for supplying said valve opening degree command read out of said initial valve opening degree holding data table for a predetermined first time period starting from the operation of said air conditioner.

4. A controller according to claim 1, wherein said valve controlling means includes a super heat temperature setting data table for storing a relationship between a rotation speed of said compressor and a super heat temperature to be set.

5. A controller according to claim 4, wherein said valve controlling means includes a correction value table, responsive to an inputted difference between said corrected temperature difference and a super heat temperature read from said super heat temperature setting data table, for outputting a stored correction value of said valve opening degree corresponding to said inputted difference.

6. A controller according to claim 5, wherein said valve controlling means includes a second timer used for correcting said valve opening command read from said initial opening degree holding data table at a predetermined time interval, in accordance with said correction value read from said correction value table.

* * * * *